United States Patent
Wu

(12) 
(10) Patent No.: US 12,084,794 B1
(45) Date of Patent: Sep. 10, 2024

(54) SINGLE-FACED PILE FABRIC AND PREPARATION METHOD THEREOF

(71) Applicant: CHANGSHU HUAKUN KNITTING CO., LTD., Jiangsu (CN)

(72) Inventor: Jian Wu, Jiangsu (CN)

(73) Assignee: CHANGSHU HUAKUN KNITTING CO., LTD., Jiangsu (CN)

( * ) Notice: Subject to any disclaimer, the term of this patent is extended or adjusted under 35 U.S.C. 154(b) by 0 days.

(21) Appl. No.: 18/538,213

(22) Filed: Dec. 13, 2023

Related U.S. Application Data

(63) Continuation of application No. PCT/CN2023/115713, filed on Aug. 30, 2023.

(30) Foreign Application Priority Data

Jun. 12, 2023 (CN) .......................... 202310687838.1

(51) Int. Cl.
*D04B 1/02* (2006.01)

(52) U.S. Cl.
CPC ............ *D04B 1/02* (2013.01); *D10B 2331/04* (2013.01)

(58) Field of Classification Search
None
See application file for complete search history.

(56) References Cited

U.S. PATENT DOCUMENTS

2020/0002855 A1* 1/2020 Aristizabal .............. D04B 1/22

* cited by examiner

*Primary Examiner* — Shawn McKinnon
(74) *Attorney, Agent, or Firm* — Cooper Legal Group, LLC

(57) ABSTRACT

A single-faced pile fabric is disclosed, including a plain knitted face and a pile face, a yarn of the plain knitted face has a shrinkage of 14-16%, a yarn of the pile face has a shrinkage of 9-10%, and a connection yarn configured for connecting the plain knitted face and pile face has a shrinkage of 29-31%.

9 Claims, 1 Drawing Sheet

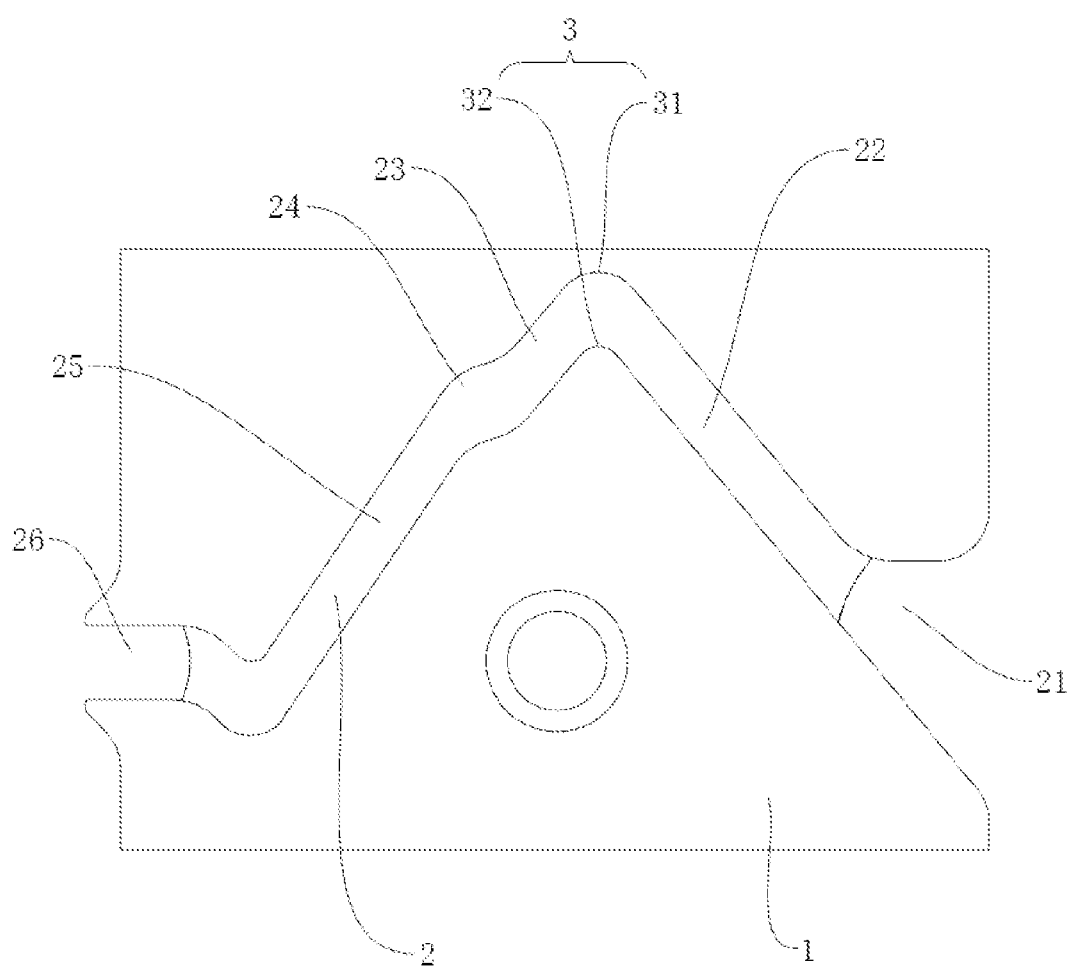

SINGLE-FACED PILE FABRIC AND PREPARATION METHOD THEREOF

CROSS-REFERENCE TO RELATED APPLICATION

This application is continuation of PCT application no. PCT/CN2023/115713, filed on Aug. 30, 2023, which claims the priority and benefits to Chinese patent application No. 202310687838.1, filed on Jun. 12, 2023. The entireties of PCT application no. PCT/CN2023/115713 and Chinese patent application No. 202310687838.1 are hereby incorporated by reference herein and made a part of this specification.

TECHNICAL FIELD

The present application relates to the technical field of fabric, and particularly to a single-faced pile fabric and preparation method thereof.

BACKGROUND ART

A pile fabric is a fabric with fluffs on its surface or having a fluffy appearance through fluff finishing. Fluff processing of the fabric can improve its style and appearance, so that the surface of the fabric is endowed with woolen-type feeling and warm-keeping ability, and the fabric becomes fluffy and thick, provided with a soft feel, as well as increased added value.

Currently, in order to increase a thickness of the pile fabric, a general method includes compositing single-layer pile fabrics with another single-layer plain weave fabrics, or weaving a plain knitted face and a pile face together on a circular loom. However, for the compositing, an adhesive is used during compositing, which more or less has hazardous substances, so that the adhesive, when being used during the producing and processing of the fabric and even subsequently use of the fabric, has a certain degree of impact on human body. In addition, for the weaving, the thickness of obtained fabric is only a sum of thicknesses of the plain knitted face and the pile face, which, however, cannot meet a requirement of increasing the thickness of the fabric from enterprise.

Therefore, there is an urgent necessity on how to solve the above problem.

SUMMARY

In order to increasing the thickness of fabric, the present application provides a single-faced pile fabric and preparation method thereof.

In a first aspect, the present application provides a single-faced pile fabric, adopting the following technical solution:
  a single-faced pile fabric includes a plain knitted face and a pile face, wherein a yarn of the plain knitted face has a shrinkage of 14-16%, a yarn of the pile face has a shrinkage of 9-10%, and a connection yarn configured for connecting the plain knitted face with pile face has a shrinkage of 29-31%; and
  a work drum in a circular knitting machine configured for preparing the single-faced pile fabric has a height of 124 mm, a needle slot is formed on a cam of the circular knitting machine, and the needle slot successively includes a needle feeding section, a needle elevating section, a needle drop section, a shoulder section, a loop-forming section and a needle return section; an arc-shaped corner is provided between the needle elevating section and the needle drop section, and the arc-shaped corner includes an upper vertex and a lower vertex; the cam has a height of 25.5 mm, a distance between the lower vertex of the arc-shaped corner and a bottom of the cam is 18.85-21.35 mm; a distance between a lower inner wall of the needle return section and a bottom of the cam is 6.35-7.85 mm; and the needle slot has a width of 3.151-3.153 mm.

In the above technical solution, during weaving, the yarn of the pile face is always arranged as a thread loop, and the plain knitted face and the pile face are connected by a connection yarn with high shrinkage. During subsequent processing, the connection yarn has a greater contraction than the pile face, and the thread loop of the pile face is tensioned by the connection yarn during shrinking, which increases a height of the thread loop, thereby increasing a thickness of the pile face, and further increasing a whole thickness of the fabric.

In addition, a distance between the lower vertex of the arc-shaped corner of the cam and the bottom of the cam is less than 18 mm in general. In the present application, increasing the distance between the lower vertex and the bottom of the cam can rise the upper vertex and the lower vertex of the arc-shaped corner, increase the height of the thread loop of the pile face, and further increase the thickness of the pile face. While the work drum of the circular knitting machine has a height greater than 124 mm in general, and the height of the thread loop of the pile face can be increased by lowering the height of the work drum in the present application. It can be known from the above technical solutions that, the thickness of the obtained fabric in the present application can be effectively increased, and there is no adhesive during composition to realize energy conservation and environmental protection, therefore, the fabric with a thicker thickness can be prepared on the circular knitting machine.

In a specific embodiment, the yarn of the plain knitted face has the shrinkage of 15%, the yarn of the pile face has the shrinkage of 9.5%, and the connection yarn configured for connecting the plain knitted face and pile face has the shrinkage of 30%.

By adopting the above technical solution, the shrinkage of the plain knitted face and the connection yarn has a large difference value from the shrinkage of the pile face and the connection yarn, which can effectively increase the thickness of the pile face during subsequent processing.

In a specific embodiment, a density of the plain knitted face is greater than a density of the pile face.

In the above technical solution, when the costume is made, the plain knitted face is positioned at outside, the pile face is positioned at inside, and the plain knitted face has a large density, so as to improve windproof and warm-keeping effects of the costume, and further adaptively improve an anti-pilling effect at the same time.

In a specific embodiment, a polydopamine membrane is wrapped on a surface of a yarn for the pile face, and the yarn for the pile face is made of the following raw materials in parts by weight: 100-120 parts of polyester slices and 10-12 parts of silane grafted mica powder.

In the above technical solution, the mica powder has good corrosion resistance against acid and alkali, elasticity and toughness, and has a smooth texture because of its sheet structure. The mica powder also has good wear resistance. Therefore, adding the mica powder into the yarn during preparation process can endow yarn with wear resistance and reduce a possibility of pilling phenomenon of the fiber in the yarn due to poor wear resistance. In addition, silane is grafted with mica powder, during forming process of the yarn, the mica powder can be arranged on the surface of the yarn due to the migration of silane in the system, so that the surface of the yarn is smoother and more wear-resistant, thereby further reducing the possibility of pilling phenomenon of the fabric. Further, limiting a dosage of silane grafted mica powder can endow the yarn with wear-resistance and toughness, in which adding too little silane grafted mica powder cannot enhance the wear-resistance of the yarn, while adding too much silane grafted mica powder may reduce the toughness of the yarn.

After the yarn is formed, a polydopamine membrane is wrapped on the surface of the yarn. Firstly, the polydopamine film has dense and smooth structure, which can improve smoothness of the surface of the yarn and reduce pilling phenomenon caused by friction. Secondly, the surface of polydopamine contains abundant active groups such as phenolic hydroxyl groups and amino groups. The oxygen atoms of the phenolic hydroxyl groups are $sp^2$ hybridization, which provides a pair of lone pair electrons to form delocalized bonds with carbon atoms of benzene ring, an electron pushing effect of hydroxyl groups enhances the polarity of oxygen-hydrogen bond, and active groups of the polydopamine can generate intermolecular forces with the groups of silane. Therefore, the polydopamine membrane can be firmly attached on the surface of the yarn, which reduces a possibility of the polydopamine membrane falling off the surface of the yarn because of friction, so that the surface of the yarn can maintain a lasting smoothness.

When the silane grafted mica powder is used by combining with the polydopamine membrane wrapped on the surface of the yarn, the anti-pilling effect of the yarn is achieved by using the polydopamine membrane at first. When the polydopamine membrane falls off the yarn due to wear during use, the mica powder arranged and gathered on the surface of the yarn has an anti-pilling effect. Therefore, the yarn has lasting anti-pilling performance due to the combination of the above two.

In a specific embodiment, the polyester slices are modified by macromolecular long-chain silane, and the silane grafted mica powder is obtained by grafting small molecule silane with mica powder.

In the above technical solution, both the macromolecular long-chain silane and the small molecule silane have a tendency to migrate, and the small molecule silane is easier to migrate comparing with the macromolecular long-chain silane. During forming process of the yarn, the mica powders are promoted to gather towards the surface of the yarn by the small molecule silane, and long chains of the macromolecular long-chain silane are extended from inside to the surface of the yarn. The long chains of the macromolecular long-chain silane not only provide functional groups to interact with active groups of the polydopamine, but also promote the mall molecule silane to uniformly disperse in the system, therefore, the mica powder can be uniformly arranged on the surface of the yarn, and the yarn has the more uniform and stable structure and performance, further reducing a pilling problem of the fabric during long-term using process.

In a specific embodiment, the polyester slices are prepared by mixing the polyester slices and the hexadecyltrimethoxysilane in a weight ratio of 100:(2-3), continuously stirring and mixing at 60-70° C., after drying to obtain processed polyester slices.

In a specific embodiment, the macromolecular long-chain silane is one selected from a group consisting of octadecyltrimethoxysilane or hexadecyltrimethoxysilane.

In the above technical solution, the macromolecular long-chain silane can be grafted on the polyester slices, during subsequent preparation of the yarn, the mica powder can be uniformly dispersed by the macromolecular long-chain silane on the polyester slices, which can also react with the polydopamine membrane, so that the polydopamine membrane can be firmly attached on the surface of the yarn.

In a specific embodiment, the silane grafted mica powder is prepared by adding the mica powder into a small molecule silane aqueous solution, heating to 60-70° C. to allow reaction, and filtering and drying to obtain the silane grafted mica powder.

In a specific embodiment, the small molecule silane is 3-aminopropyltriethoxysilane.

In the above technical solution, the small molecule silane can be grafted on the mica powder, so that the mica powder can be arranged and gathered towards the surface of the yarn due to the migration effect of the small molecule silane in the system, thereby enhancing smoothness and wear-resistance of the surface of the yarn, and reducing the fuzzing and pilling phenomenon of the yarn.

In a specific embodiment, a preparation method of the polydopamine membrane wrapped on the surface of the yarn for the pile face is as follows: immersing the yarn in a dopamine hydrochloride solution to allow reaction at 40-60° C. for 2-3 h, taking the yarn out, and drying the yarn to obtain a yarn wrapped with the polydopamine membrane on the surface of the yarn.

By adopting the above technical solution, dopamine can be self-gathered on the surface of the yarn, so as to form the polydopamine membrane.

In a second aspect, the present application provides a preparation method for the single-faced pile fabric including the step of:

weaving a yarn with a shrinkage of 14-16% used as a yarn used for plain knitted face, a yarn with a shrinkage of 9-10% used as a yarn for the pile face, and a yarn with a shrinkage of 29-31% used as a connection yarn configured for connecting the plain knitted face and pile face on a circular knitting machine to obtain the single-faced pile fabric.

By adopting the above technical solution, the fabric with anti-pilling performance can be prepared.

In a third aspect, the present application provides an application method for the single-faced pile fabric configuring for making costumes.

In summary, the present application has the following beneficial effects:

1. the plain knitted face and the pile face are connected by the connection yarn with high shrinkage, and during subsequent processing, the thread loop of the pile face is tensioned, thereby increasing the thickness of the pile face, while further increasing the thickness of the fabric by adjusting the heights of the arc-shaped corner of the cam and the work drum.

2. In the present application, the mica powders are arranged and gathered on the surface of the yarn on the silane grafted mica powder at first, then the polydopamine membrane are wrapped on the surface of the yarn, so that the yarn has good anti-pilling and anti-fuzzing effect and the fabric has good using texture.

3. In the present application, the polyester slices are processed by the macromolecular long-chain silane, the mica powder is grafted by the small molecule silane, so that the mica powder can be uniformly dispersed and arranged on the surface of the yarn, while the polydopamine membrane can be firmly attached on the surface of the yarn, therefore, the yarn has lasting anti-pilling and anti-fuzzing effect.

BRIEF DESCRIPTION OF THE DRAWINGS

FIG. 1 is a structural diagram of a cam of the present application.

DETAILED DESCRIPTION

The present application will be further described in details at in combination with examples.

All the raw materials are commercially available.

Preparation Example 1

Adding mica powder into 3-aminopropyltriethoxysilane aqueous solution with a mass concentration of 3%, heating to 60° C. for reacting for 30 min, and filtrating and drying to obtain a silane grafted mica powder.

Preparation Example 2

Mixing polyester slices and hexadecyltrimethoxysilane in a weight ratio of 100:2 at 60° C. with 800 r/min for 15 min, and drying at 80° C. to obtain processed polyester slices.

Preparation Example 3

Mixing polyester slices and hexadecyltrimethoxysilane in a weight ratio of 100:3 at 70° C. with 800 r/min for 15 min, and drying at 80° C. to obtain processed polyester slices.

Preparation Example 4

Mixing polyester slices and octadecyltrimethoxysilane in a weight ratio of 100:2 at 60° C. with 800 r/min for 15 min, and drying at 80° C. to obtain processed polyester slices.

Example 1

A single-faced pile fabric included a plain knitted face and a pile face, in which a density of the plain knitted face was greater than that of the pile face, a yarn of the plain knitted face had a shrinkage of 14%, a yarn of the pile face had a shrinkage of 9%, and a connection yarn configured for connecting the plain knitted face and the pile face had a shrinkage of 29%. The above three yarns were weaved to obtain the single-faced pile fabric on a circular knitting machine, in which the fabric had a width of 150 cm and a gram weight of 400 GSM. The yarn used in this example was prepared by spinning and weaving the polyester slices.

In particular, referring to FIG. 1, a needle slot 2 was defined in a cam 1 of a circular knitting machine, and the needle slot 2 successively included a needle feeding section 21, a needle elevating section 22, a needle drop section 23, a shoulder section 24, a loop-forming section 25 and a needle return section 26. An arc-shaped corner 3 was provided between the needle elevating section 22 and the needle drop section 23, and the arc-shaped corner 3 included an upper vertex 31 and a lower vertex 32. The cam 1 had a height of 25.5 mm. A distance between the lower vertex 32 of the arc-shaped corner 3 and a bottom of the cam 1 was 18.85 mm. A distance between a lower inner wall of the needle return section 26 and a bottom of the cam 1 was 6.35 mm. The needle slot 2 had a width of 3.151 mm. A work drum in the circular knitting machine had a height of 124 mm.

Example 2

A single-faced pile fabric included a plain knitted face and a pile face, in which a density of the plain knitted face was greater than that of the pile face, a yarn of the plain knitted face had a shrinkage of 15%, a yarn of the pile face had a shrinkage of 9.5%, and a connection yarn configured for connecting the plain knitted face and pile face had a shrinkage of 30%. The above three yarns were weaved to obtain the single-faced pile fabric on a circular knitting machine, and the fabric had a width of 150 cm and a gram weight of 400 GSM. The yarn used in this example was prepared by spinning and weaving the polyester slices.

In particular, referring to FIG. 1, a needle slot 2 was formed on a cam 1 of the circular knitting machine, and the needle slot 2 successively included a needle feeding section 21, a needle elevating section 22, a needle drop section 23, a shoulder section 24, a loop-forming section 25 and a needle return section 26. An arc-shaped corner 3 was provided between the needle elevating section 22 and the needle drop section 23, and the arc-shaped corner 3 included an upper vertex 31 and a lower vertex 32. The cam 1 had a height of 25.5 mm. A distance between the lower vertex 32 of the arc-shaped corner 3 and a bottom of the cam 1 was 21.35 mm. A distance between a lower inner wall of the needle return section 26 and a bottom of the cam 1 was 6.35 mm. The needle slot 2 had a width of 3.153 mm. A work drum in the circular knitting machine had a height of 124 mm.

Example 3

A single-faced pile fabric included a plain knitted face and a pile face, in which a density of the plain knitted face was greater than that of the pile face, a yarn of the plain knitted face had a shrinkage of 16%, a yarn of the pile face had a shrinkage of 10%, and a connection yarn configured for connecting the plain knitted face and pile face had a shrinkage of 31%. The above three yarns were weaved to obtain the single-faced pile fabric on a circular knitting machine, the fabric had a width of 150 cm and a gram weight of 400 GSM. The yarn used in this example was prepared by spinning and weaving the polyester slices.

In particular, referring to FIG. 1, a needle slot 2 was formed on a cam 1 of the circular knitting machine, and the needle slot 2 successively included a needle feeding section 21, a needle elevating section 22, a needle drop section 23, a shoulder section 24, a loop-forming section 25 and a needle return section 26. An arc-shaped corner 3 was provided between the needle elevating section 22 and the needle drop section 23, and the arc-shaped corner 3 included an upper vertex 31 and a lower vertex 32. The cam 1 had a height of 25.5 mm. A distance between the lower vertex 32 of the arc-shaped corner 3 and a bottom of the cam 1 was 20.35 mm. A distance between a lower inner wall of the needle return section 26 and a bottom of the cam 1 was 7.85 mm. The needle slot 2 had a width of 3.153 mm. A work drum in the circular knitting machine had a height of 124 mm.

Example 4

This example differed from Example 2 in that:

The yarn used for the pile face was prepared by the following method:

S1. accurately weighing 1000 g of the polyester slices and 100 g of the silane grafted mica powder prepared in Preparation Example 1, mixing, granulating by extruding through a screw extruder to obtain particles, feeding the particles into a spinning unit, performing stretch spinning at a spinning temperature at 280° C. and a draft ratio of 3.4, collecting spinning fibers, cooling to room temperature, and spinning to obtain a yarn; and S2. immersing the yarn in a dopamine hydrochloride solution, reacting at 40° C. for 2 h, taking the yarn out, and drying in the air to obtain the yarn used for the pile face, in which the dopamine hydrochloride solution was prepared by dissolving 0.2 g of dopamine hydrochloride into 100 mL of 0.01 mol/L Tris buffer solution with pH of 8.5.

Example 5

This example differed from Example 2 in that:

The yarn used for the pile face was prepared by the following method:

S1. accurately weighing 1100 g of the polyester slices and 110 g of the silane grafted mica powder prepared in Preparation Example 1, mixing, granulating by extruding through a screw extruder to obtain particles, feeding the particles into a spinning unit, performing stretch spinning at a spinning temperature at 280° C. and a draft ratio of 3.4, collecting spinning fibers, cooling to room temperature, and spinning the spinning fibers to obtain the yarn; and S2. immersing the yarn in a dopamine hydrochloride solution, reacting at 40° C. for 2 h, taking the yarn out, and drying in the air to obtain the yarn used for the pile face, in which the dopamine hydrochloride solution was prepared by dissolving 0.2 g of dopamine hydrochloride into 100 mL of 0.01 mol/L Tris buffer solution with pH of 8.5.

Example 6

This example differed from Example 2 in that:

The yarn used for the pile face was prepared by the following method:

S1. accurately weighing 1200 g of the polyester slices and 120 g of the silane grafted mica powder prepared in Preparation Example 1, mixing, granulating by extruding through a screw extruder to obtain particles, feeding the particles into a spinning unit, performing stretch spinning at a spinning temperature at 280° C. and a draft ratio of 3.4, collecting spinning fibers, cooling to room temperature, and spinning the spinning fibers to obtain the yarn; and S2. immersing the yarn in a dopamine hydrochloride solution, reacting at 40° C. for 2 h, taking the yarn out, and drying in the air to obtain the yarn used for the pile face, in which the dopamine hydrochloride solution was prepared by dissolving 0.2 g of dopamine hydrochloride into 100 mL and 0.01 mol/L of Tris buffer solution with pH of 8.5.

Example 7

This example differed from Example 2 in that:

The yarn used for the pile face was prepared by the following method:

S1. accurately weighing 1000 g of the polyester slices and 100 g of the silane grafted mica powder prepared in Preparation Example 1, mixing, granulating by extruding through a screw extruder to obtain particles, feeding the particles into a spinning unit, performing stretch spinning at a spinning temperature at 280° C. and a draft ratio of 3.4, collecting spinning fibers, cooling to room temperature, and spinning the spinning fibers to obtain the yarn; and S2. immersing the yarn in a dopamine hydrochloride solution, reacting at 60° C. for 3 h, taking the yarn out, and drying in the air to obtain the yarn used for the pile face, in which the dopamine hydrochloride solution was prepared by dissolving 0.2 g of dopamine hydrochloride into 100 mL of 0.01 mol/L Tris buffer solution with pH of 8.5.

Example 8

This example differed from Example 2 in that:

The yarn used for the pile face was prepared by the following method:

S1. accurately weighing 1000 g of the polyester slices prepared in Preparation Example 2 and 100 g of the silane grafted mica powder prepared in Preparation Example 1, mixing, granulating by extruding through a screw extruder to obtain particles, feeding the particles into a spinning unit, performing stretch spinning at a spinning temperature at 280° C. and a draft ratio of 3.4, collecting spinning fibers, cooling to room temperature, and spinning the spinning fibers to obtain the yarn; and S2. immersing the yarn in a dopamine hydrochloride solution, reacting at 40° C. for 2 h, taking the yarn out, and drying in the air to obtain the yarn used for the pile face, in which the dopamine hydrochloride solution was prepared by dissolving 0.2 g of dopamine hydrochloride into 100 mL of 0.01 mol/L Tris buffer solution with pH of 8.5.

Example 9

This example differed from Example 2 in that:

The yarn used for the pile face was prepared by the following method:

S1. accurately weighing 1000 g of the polyester slices prepared in Preparation Example 3 and 100 g of the silane grafted mica powder prepared in Preparation Example 1, mixing, granulating by extruding through a screw extruder to obtain particles, feeding the particles into a spinning unit, performing stretch spinning at a spinning temperature at 280° C. and a draft ratio of 3.4, collecting spinning fibers, cooling to room temperature, and spinning the spinning fibers to obtain the yarn; and S2. immersing the yarn in a dopamine hydrochloride solution, reacting at 40° C. for 2 h, taking the yarn out, and drying in the air to obtain the yarn used for the pile face, in which the dopamine hydrochloride solution was prepared by dissolving 0.2 g of dopamine hydrochloride into 100 mL of 0.01 mol/L Tris buffer solution with pH of 8.5.

Example 10

This example differed from Example 2 in that:

The yarn used for the pile face was prepared by the following method:

S1. accurately weighing 1000 g of the polyester slices prepared in Preparation Example 4 and 100 g of the silane grafted mica powder prepared in Preparation Example 1, mixing, granulating by extruding through a screw extruder to obtain particles, feeding the particles into a spinning unit, performing stretch spinning at a spinning temperature at 280° C. and a draft ratio of 3.4, collecting spinning fibers, cooling to room temperature, and spinning the spinning fibers to obtain the yarn; and S2. immersing the yarn in a dopamine hydrochloride solution, reacting at 40° C. for 2 h, taking the yarn out, and drying in the air to obtain the yarn used for the pile face, in which the dopamine hydrochloride solution was prepared by dissolving 0.2 g of dopamine hydrochloride into 100 mL of 0.01 mol/L Tris buffer solution with pH of 8.5.

Comparative Example 1

A single-faced pile fabric included a plain knitted face and a pile face, in which a density of the plain knitted face was greater than that of the pile face, a yarn of the plain knitted face had a shrinkage of 15%, a yarn of the pile face had a shrinkage of 9.5%, and a connection yarn configured for connecting the plain knitted face and pile face had a shrinkage of 5%. The above three yarns were weaved to obtain the single-faced pile fabric on a circular knitting machine, in which the fabric had a width of 150 cm and a gram weight of 400 GSM. The yarn used in this example was prepared by spinning and weaving the polyester slices.

In particular, referring to FIG. 1, a needle slot 2 was defined in a cam 1 of the circular knitting machine, and the needle slot 2 successively included a needle feeding section 21, a needle elevating section 22, a needle drop section 23, a shoulder section 24, a loop-forming section 25 and a needle return section 26. An arc-shaped corner 3 was provided between the needle elevating section 22 and the needle drop section 23, and the arc-shaped corner 3 included an upper vertex 31 and a lower vertex 32. The cam 1 had a height of 25.5 mm. A distance between the lower vertex 32 of the arc-shaped corner 3 and a bottom of the cam 1 was 21.35 mm. A distance between a lower inner wall of the needle return section 26 and a bottom of the cam 1 was 6.35 mm. The needle slot 2 had a width of 3.153 mm. A work drum in the circular knitting machine had a height of 124 mm.

Comparative Example 2

A single-faced pile fabric included a plain knitted face and a pile face, a density of the plain knitted face was greater than that of the pile face, a yarn of the plain knitted face had a shrinkage of 15%, a yarn of the pile face had a shrinkage of 9.5%, and a connection yarn configured for connecting the plain knitted face and pile face had a shrinkage of 30%. The above three yarns were weaved on a circular knitting machine to obtain the single-faced pile fabric, in which the fabric had a width of 150 cm and a gram weight of 400 GSM. The yarn used in this example was prepared by spinning and weaving the polyester slices.

In particular, referring to FIG. 1, a needle slot 2 was formed on a cam 1 of the circular knitting machine, and the needle slot 2 successively included a needle feeding section 21, a needle elevating section 22, a needle drop section 23, a shoulder section 24, a loop-forming section 25 and a needle return section 26. An arc-shaped corner 3 was provided between the needle elevating section 22 and the needle drop section 23, and the arc-shaped corner 3 included an upper vertex 31 and a lower vertex 32. The cam 1 had a height of 25.5 mm. A distance between the lower vertex 32 of the arc-shaped corner 3 and a bottom of the cam 1 was 16.5 mm. A distance between a lower inner wall of the needle return section 26 and a bottom of the cam 1 was 6.35 mm. The needle slot 2 had a width of 3.153 mm. A work drum in the circular knitting machine had a height of 124 mm.

Comparative Example 3

A single-faced pile fabric included a plain knitted face and a pile face, in which a density of the plain knitted face was greater than that of the pile face, a yarn of the plain knitted face had a shrinkage of 15%, a yarn of the pile face had a shrinkage of 9.5%, and a connection yarn configured for connecting the plain knitted face and pile face had a shrinkage of 30%. The above three yarns were weaved to obtain the single-faced pile fabric on a circular knitting machine, the fabric had a width of 150 cm and a gram weight of 400 GSM. The yarn used in this example was prepared by spinning and weaving the polyester slices.

In particular, referring to FIG. 1, a needle slot 2 was defined in a cam 1 of a circular knitting machine, and the needle slot 2 successively included a needle feeding section 21, a needle elevating section 22, a needle drop section 23, a shoulder section 24, a loop-forming section 25 and a needle return section 26. An arc-shaped corner 3 was provided between the needle elevating section 22 and the needle drop section 23, and the arc-shaped corner 3 included an upper vertex 31 and a lower vertex 32. The cam 1 had a height of 25.5 mm. A distance between the lower vertex 32 of the arc-shaped corner 3 and a bottom of the cam 1 was 21.35 mm. A distance between a lower inner wall of the needle return section 26 and a bottom of the cam 1 was 6.35 mm. The needle slot 2 had a width of 3.153 mm. A work drum in the circular knitting machine had a height of 125 mm.

Comparative Example 4

This comparative example differed from Example 4 in that:

The yarn used for the pile face was prepared by the following method:

S1. accurately weighing 1000 g of the polyester slices and 100 g of the silane grafted mica powder, mixing, granulating by extruding through a screw extruder to obtain particles, feeding the particles into a spinning unit, performing stretch spinning at a spinning temperature at 280° C. and a draft ratio of 3.4, collecting spinning fibers, cooling to room temperature, and spinning the spinning fibers to obtain the yarn; and S2. immersing the yarn in a dopamine hydrochloride solution, reacting at 40° C. for 2 h, taking the yarn out, and drying in the air to obtain the yarn used for the pile face, in which the dopamine hydrochloride solution was prepared by dissolving 0.2 g of dopamine hydrochloride into 100 mL of 0.01 mol/L Tris buffer solution with pH of 8.5.

Comparative Example 5

This comparative example differed from Example 4 in that:

The yarn used for the pile face was prepared by the following method:

S1. accurately weighing 1000 g of the polyester slices and 100 g of the silane grafted mica powder prepared in Preparation Example 1, mixing, granulating by extruding through a screw extruder to obtain particles, feeding the particles into a spinning unit, performing stretch spinning at a spinning temperature at 280° C. and a draft ratio of 3.4, collecting spinning fibers, cooling to room temperature, and spinning the spinning fibers to obtain the yarn.

Comparative Example 6

This comparative example differed from Example 8 in that:

The silane grafted mica powder was prepared by the following method:

adding mica powder into hexadecyltrimethoxysilane aqueous solution with a mass concentration of 3%, heating to 60° C. to allow reaction for 30 min, and filtrating and drying to obtain a silane grafted mica powder.

Comparative Example 7

This comparative example differed from Example 8 in that:

The polyester slices was prepared by the following method:

mixing the polyester slices and 3-Aminopropyltriethoxysilane in a weight ratio of 100:2 at 70° C. with 800 r/min for 15 min, and drying at 80° C. to obtain processed polyester slices.

Performance Test (1) The fabrics prepared in Examples 1-3 and Comparative examples 1-3 was heated in a water bath of 95° C. for 30 min, air dried, and spread. The thickness was measured and recorded.

TABLE 1

Measuring results of thickness of the fabrics

| Groups | Example 1 | Example 2 | Example 3 | Comparative example 1 | Comparative example 2 | Comparative example 3 |
|---|---|---|---|---|---|---|
| Thickness (mm) | 5.2 | 5.5 | 5.3 | 3.1 | 2.9 | 2.8 |

Referring to FIG. 1, comparing with Comparative example 1, the fabrics of Examples 1-3 have thicker thickness, showing that, connecting the plain knitted face and the pile face by a connection yarn with high shrinkage can tension thread loops in the pile face, thereby increasing a height of the thread loops of the pile face. While comparing with Comparative examples 2-3, the fabric of Example 1 has a greater thickness, showing that, raising a position of the vertex of the arc-shaped corner of the cam and lowering a height of the work drum can increase a height of the thread loop of the pile face, and further increase the thickness of the obtained fabric.

(2) The pile faces of the fabrics were conducted pilling and fuzzing tests in accordance with "GB/T4802.2 of Textiles—Determination of fabric propensity to surface fuzzing and to pilling-Part 2: Modified Martindale method". Three samples were taken from each of examples and comparative examples, and after rotated for 2000 revolutions on YG401G fabric grinding machine, the samples were rated through comparing standard sample in the YG982D pilling rating box to obtain the average of three samples. Further, the samples were rotated for 3000 revolutions on YG401G fabric grinding machine, and the samples were rated again through comparing standard sample in the YG982D pilling rating box to obtain the average of three samples.

TABLE 2 pilling and fuzzing test data of fabrics of each of examples and comparative examples

| Category | Data after friction of 2000 revolutions | | Data after friction of 2000 revolutions | |
|---|---|---|---|---|
| | Pilling grade | Number of pillings | Pilling grade | Number of pillings |
| Example 2 | 3.5 grades | 21 | 2 grades | 30 |
| Example 4 | 4.5 grades | 9 | 4 grades | 13 |
| Example 5 | 4.5 grades | 8 | 4 grades | 12 |
| Example 6 | 4.5 grades | 8 | 4 grades | 12 |
| Example 7 | 4.5 grades | 8 | 4 grades | 11 |
| Example 8 | 5 grades | 3 | 4.5 grades | 6 |
| Example 9 | 5 grades | 1 | 4.5 grades | 3 |
| Example 10 | 5 grades | 2 | 4.5 grades | 5 |
| Comparative example 4 | 4 grades | 20 | 3 grades | 23 |
| Comparative example 5 | 4 grades | 26 | 2.5 grades | 25 |
| Comparative example 6 | 4 grades | 17 | 3 grades | 21 |
| Comparative example 7 | 4 grades | 15 | 3 grades | 19 |

Referring to table 2, comparing with Comparative example 4, the fabrics of Examples 4-6 have better anti-pilling and anti-fuzzing performance, showing that, the mica powder can be gathered on the surface of the yarn by using the silane grafted mica powder, which can increase smoothness and wear resistance of the yarn, so that the fabric has better anti-pilling and anti-fuzzing performance.

Comparing with Comparative example 5, the fabrics of Examples 1 and 7 have better anti-pilling and anti-fuzzing performance, showing that, the smoothness and wear resistance of the yarn can be increased and pilling phenomenon of the yarn because of friction can be reduced by wrapping a polydopamine membrane on the surface of the yarn and using a smooth and dense structure of the polydopamine membrane. After frication of 5000 revolutions, the fabrics of Examples 1 and 7 still have better anti-pilling and anti-fuzzing performance, showing that, the polydopamine membrane wrapped on the surface of the yarn can be removed because of friction after excessive friction, and the mica powder on the surface of the yarn develop a main anti-pilling and anti-fuzzing effect at the same time, so that the fabric has better anti-pilling and anti-fuzzing performance.

Combining with Examples 1, 8-10, the polyester slices is previously processed by macromolecular long-chain silane, and active groups provided by the macromolecular long-chain silane can interact with the polydopamine membrane, so that the polydopamine membrane can be firmly attached on the surface of the yarn, persistence of the anti-pilling performance of the yarn can be increased, dispersion uniformity of small molecule silane in the system can be promoted at the same time, further the mica powder can be dispersed on the surface of the yarn more uniformly, thereby further improving anti-pilling performance of the yarn.

Combining with Examples 8 and Comparative example 6, the yarn of the Example 8 has better anti-pilling effect, it can be shown that after analysis, after the polyester slices and the mica powder are processed by the macromolecular long-chain silane, silane long-chain of the polyester slices may wind with silane long-chain of the mica powder in the whole system, which will influence movement of the mica powder in the system, hinder the mica powder from gathering on the surface of the yarn, so that the anti-pilling performance of the yarn of Example 6 is weaker than that of the Example 8.

Combining with Examples 8 and Comparative example 7, the yarn of the Comparative example 7 has poor anti-pilling effect, it can be shown that after analysis, after the polyester slices and the mica powder are processed by the small molecule silane, during forming the yarn, the mica powders are gathered on the surface of the yarn due to migration effect of the small molecule silane, and the small molecule silane of the polyester slices cannot extend to the surface of the yarn due to its short chain, so that the polydopamine membrane can only interact with the small molecule silane of the mica powder. Therefore, comparing with the polydopamine membrane of the yarn in Example 8 interacting with the macromolecular long-chain silane and the small molecule silane at the same time, there is a small firmness of the polydopamine membrane on the yarn in Comparative example 7, so that the yarn in Comparative example 7 has a worse anti-pilling effect than that of Example 8.

The specific examples are only configured for illustrating the present application, not intended to limit the present application. This example can be made any non-creative changes according to requirements by those skilled in the technical field after reading this specification, and they are protected by patent law as long as they fall within the scope of the claims in the present application.

LISTS OF REFERENCE SIGNS

1. Cam
2. Needle slot
21. Needle feeding section
22. Needle elevating section
23. Needle drop section
24. Shoulder section
25. Loop-forming section
26. Needle return section
3. Arc-shaped corner
31. Upper vertex
32. Lower vertex

What is claimed is:

1. A single-faced pile fabric, comprising a plain knitted face and a pile face, wherein a yarn of the plain knitted face has a shrinkage of 14-16%, a yarn of the pile face has a shrinkage of 9-10%, and a connection yarn configured for connecting the plain knitted face with the pile face has a shrinkage of 29-31%; and wherein the single-faced pile fabric is prepared by using a circular knitting machine, and a work drum in the circular knitting machine has a height of 124 mm; a needle slot is formed on a cam of the circular knitting machine, and the needle slot successively comprises a needle feeding section, a needle elevating section, a needle drop section, a shoulder section, a loop-forming section and a needle return section; an arc-shaped corner is provided between the needle elevating section and the needle drop section, and the arc-shaped corner comprises an upper vertex and a lower vertex; the cam has a height of 25.5 mm, a distance between the lower vertex of the arc-shaped corner and a bottom of the cam is 18.85-21.35 mm; a distance between a lower inner wall of the needle return section and the bottom of the cam is 6.35-7.85 mm; and the needle slot has a width of 3.151-3.153 mm.

2. The single-faced pile fabric according to claim 1, wherein the yarn of the plain knitted face has the shrinkage of 15%, the yarn of the pile face has the shrinkage of 9.5%, and the connection yarn configured for connecting the plain knitted face with the pile face has the shrinkage of 30%.

3. The single-faced pile fabric according to claim 1, wherein a density of the plain knitted face is greater than a density of the pile face.

4. The single-faced pile fabric according to claim 1, wherein a polydopamine membrane is wrapped on a surface of a yarn for the pile face, and the yarn for the pile face is made of the following raw materials in parts by weight: 100-120 parts of polyester slices and a 10-12 parts of silane grafted mica powder.

5. The single-faced pile fabric according to claim 4, wherein the polyester slices are modified by macromolecular long-chain silane, and the silane grafted mica powder is obtained by grafting small molecule silane with mica powder.

6. The single-faced pile fabric according to claim 5, wherein the polyester slices are prepared by mixing the polyester slices and hexadecyltrimethoxysilane in a weight ratio of 100:(2-3), continuously stirring and mixing at 60-70° C., and drying to obtain processed polyester slices.

7. The single-faced pile fabric according to claim 6, wherein the macromolecular long-chain silane is one selected from a group consisting of octadecyltrimethoxysilane and hexadecyltrimethoxysilane.

8. The single-faced pile fabric according to claim 5, wherein the silane grafted mica powder is prepared by adding the mica powder into a silane aqueous solution, heating to 60-70° C. to allow reaction, and filtering and drying to obtain the silane grafted mica powder; and the silane aqueous solution is made from 3-aminopropyltriethoxysilane.

9. The single-faced pile fabric according to claim 4, wherein a preparation method of the polydopamine membrane wrapped on the surface of the yarn for the pile face is as follows: immersing the yarn for the pile face in a dopamine hydrochloride solution to allow reaction at 40-60° C. for 2-3 h, taking the yarn for the pile face out, and drying the yarn for the pile face to obtain a yarn wrapped with the polydopamine membrane on the surface of the yarn for the pile face.

* * * * *